Dec. 5, 1961 F. W. FIELDS 3,011,619
VENEER FEEDER
Filed Feb. 24, 1960 10 Sheets-Sheet 1

INVENTOR.
FREDERICK W. FIELDS
BY Hudson Boughton,
Williams, David & Hoffman
ATTORNEYS Dec. 5, 1961  F. W. FIELDS  3,011,619
VENEER FEEDER
Filed Feb. 24, 1960  10 Sheets-Sheet 2

FIG. 3

INVENTOR.
FREDERICK W. FIELDS
BY Hudson, Boughton,
Williams, David & Hoffmann
ATTORNEYS Dec. 5, 1961  F. W. FIELDS  3,011,619
VENEER FEEDER
Filed Feb. 24, 1960  10 Sheets-Sheet 3

INVENTOR.
FREDERICK W. FIELDS
BY Hudson, Boughton,
Williams, David & Hoffmann
ATTORNEYS

FIG. 6

INVENTOR.
FREDERICK W. FIELDS

FIG. 7

INVENTOR.
FREDERICK W. FIELDS

FIG. 8

INVENTOR.
FREDERICK W. FIELDS
BY Hudson, Coughton,
Williams, David & Hoffmann
ATTORNEYS Dec. 5, 1961  F. W. FIELDS  3,011,619
VENEER FEEDER
Filed Feb. 24, 1960  10 Sheets-Sheet 8

FIG. 11

INVENTOR.
FREDERICK W. FIELDS
BY Hudson, Boughton,
Williams, David & Hoffman
ATTORNEYS

United States Patent Office 3,011,619
Patented Dec. 5, 1961

3,011,619
VENEER FEEDER
Frederick W. Fields, Portland, Oreg., assignor to The Coe Manufacturing Company, Painesville, Ohio, a corporation of Ohio
Filed Feb. 24, 1960, Ser. No. 10,764
14 Claims. (Cl. 198—20)

The present invention relates to material handling apparatus of the feeder type and more particularly, to apparatus for use in feeding veneer to a multiple deck conveyor type veneer dryer.

This application combines and supplements the subject matter of my co-pending applications, Serial Numbers 636,363, 636,364 and 636,365, filed January 25, 1957, and Serial Number 806,678, filed April 15, 1959, and is a continuation-in-part of my said applications.

The principal object of the invention is the provision of a novel and improved simple inexpensive and reliable apparatus for use in feeding veneer to a piece of equipment comprising a plurality of vertically spaced conveyors, such as, a multiple deck conveyor type veneer dryer, from a stack of veneer positioned adjacent to its infeed end, which feeding apparatus comprises a plurality of vertically spaced power driven conveyors adapted to have their discharge ends aligned with respective conveyors of the dryer, and power operated mechanism adjacent to the infeed ends of the power driven conveyors having a member adapted to engage the top of a veneer sheet to move the sheet towards the dryer, in combination with means for producing relative movement between the power operated sheet moving mechanism and the infeed ends of the power driven conveyors of the feeding apparatus adjacent thereto and actuation of the power operated sheet moving mechanism in timed relation to each other such that veneer sheets are fed to the respective power driven conveyors while they are or are substantially aligned with the power operated sheet advancing mechanism.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which:

Referring to the drawings which show four preferred embodiments of the invention, the reference character A designates the infeed end of a five deck roller conveyor type veneer dryer of commercial construction. The dryer A is not herein shown and described in detail because dryers of the type referred to are well known in the art and the dryer per se forms no part of the present invention. The rollers of the respective decks, designated 11–15, of the dryer are all driven at a predetermined uniform speed by an electric motor 16, to move sheets of veneer fed thereto through the dryer.

Figures 1, 2:
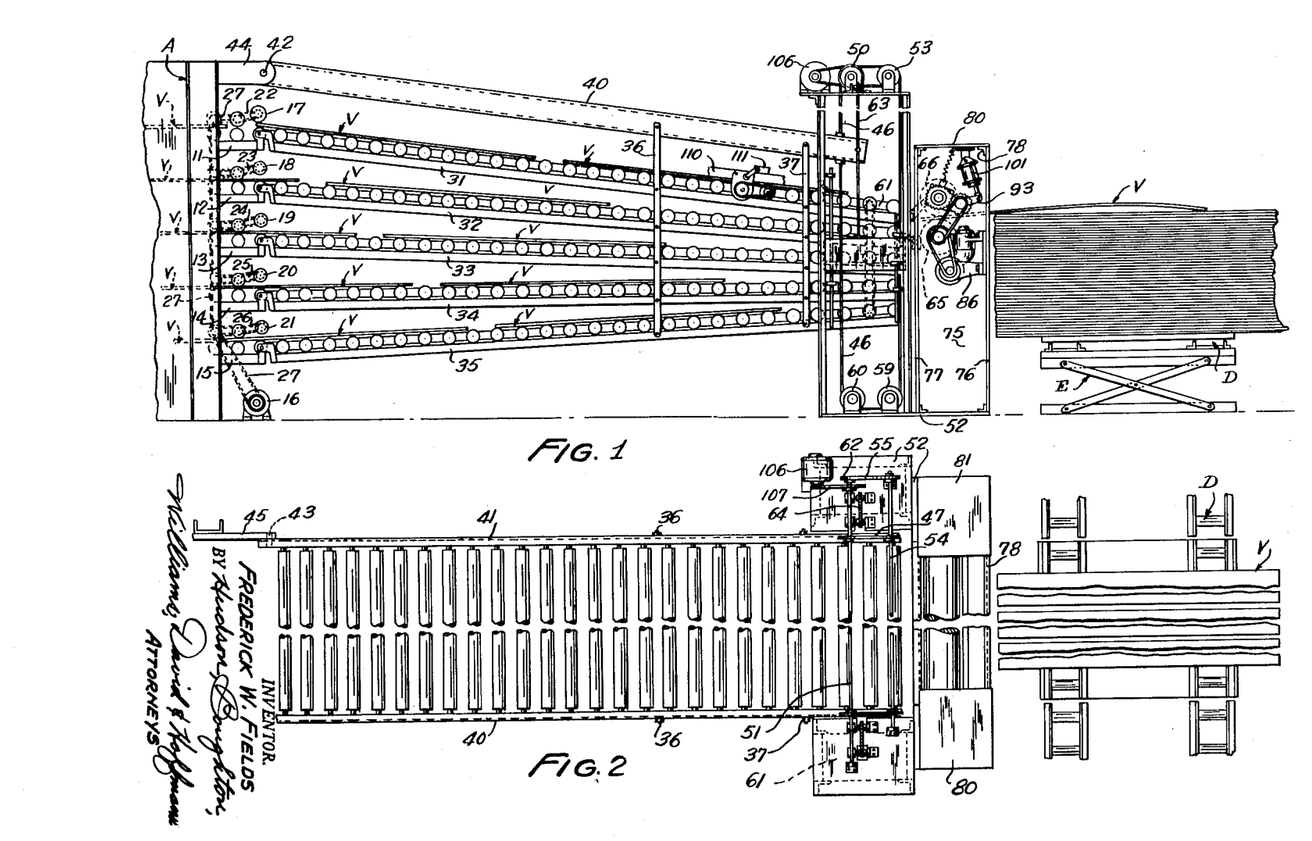
FIG. 1 is a side elevational view, with portions broken away and omitted, of apparatus embodying the present invention.
FIG. 2 is a plan view of the apparatus shown in FIG. 1.
Figure 3:
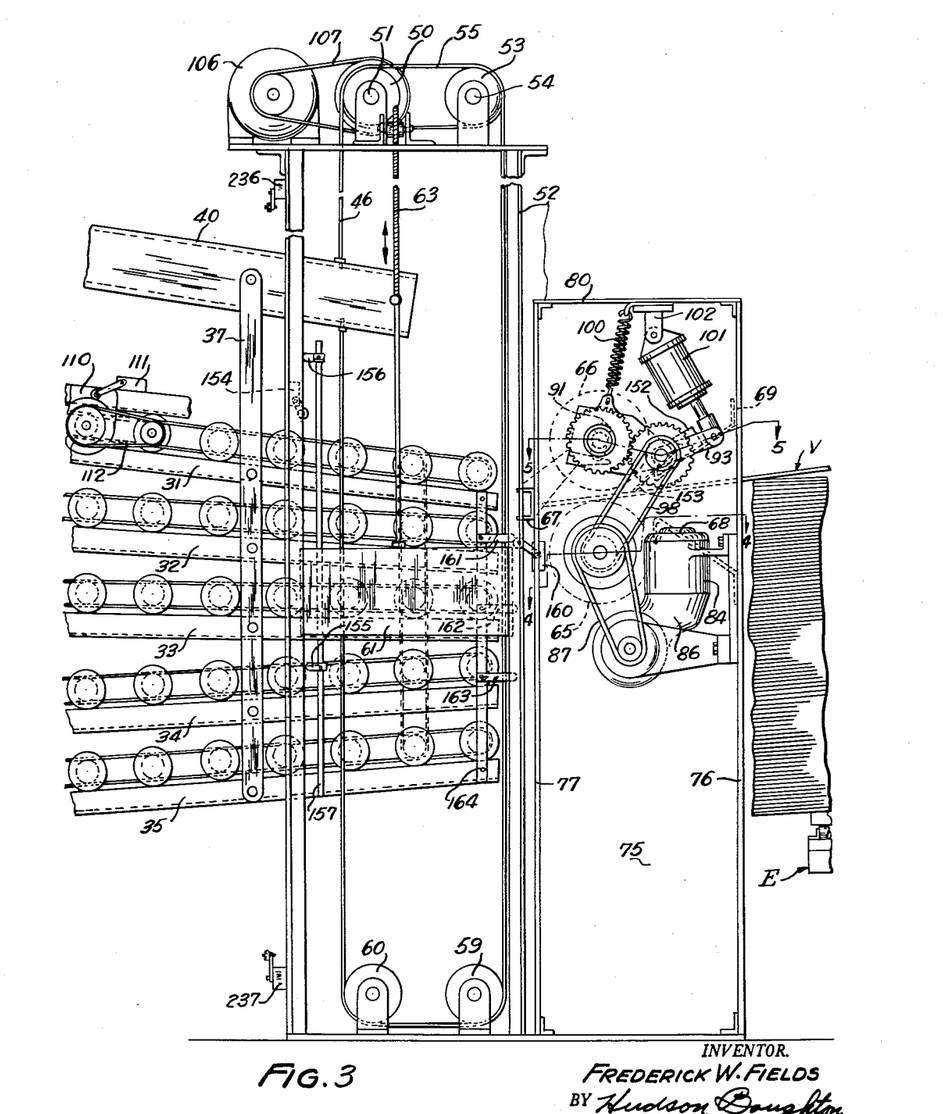
FIG. 3 is an enlarged fragmentary view of a portion of FIG. 1.
Figure 4:
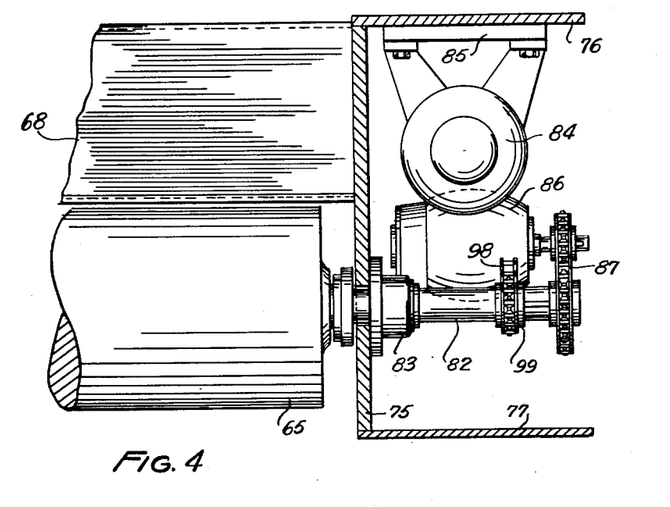
FIG. 4 is a sectional view, with portions in elevation, approximately on the line 4—4 of FIGS. 3, 7.
Figure 5:
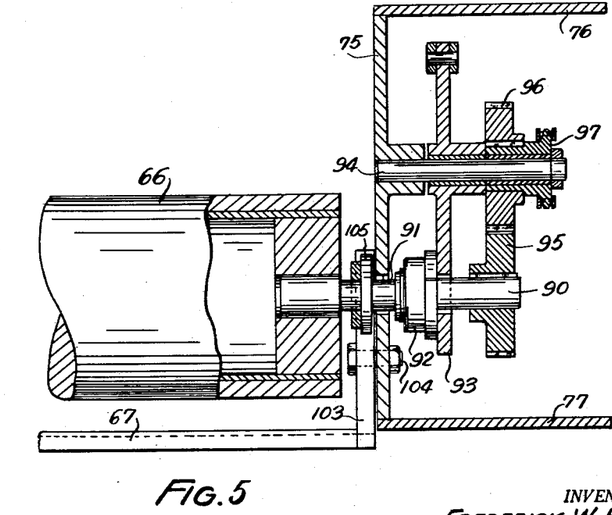
FIG. 5 is a sectional view, with portions in elevation, approximately on the line 5—5 of FIGS. 3, 7 and 9.

The respective decks of the dryer project a short distance in front of the feed-in end of the dryer proper and each deck is provided with a pair of top rollers 17–21 which cooperate with the rolls of the dryer projecting from the infeed end to assist in guiding and feeding the veneer into the dryer. The pairs of top rollers 17–21 are carried by arms 22–26 pivoted at their left-hand ends, as viewed in FIG. 1, to transversely extending shafts located above the plane of the decks proper. Gravity holds the top rollers in engagement with the rollers of their respective decks or the top sides of the sheets of veneer thereon as the case may be. The top rollers 17–21 along with the rollers of the respective decks are connected to and driven by the motor 16 through suitable sprocket chain drives designated generally by the reference character 27.

The veneer feeding apparatus shown comprises a plurality of vertically spaced power driven roller type conveyors 31–35, a power operated pinch roll type sheet advancing mechanism, and means for maintaining the top of the stack of veneer sheets to be fed and the power operated sheet advancing mechanism at the desired relative height. The power operated sheet advancing mechanism is interposed between the infeed ends of the conveyors 31–35 and the stack of veneer sheets. Because the dryer A has five decks the feeding apparatus shown comprises the five power driven conveyors 31–35. The five conveyors 31–35 have their discharge ends aligned with the entrance ends of the dryer conveyors 11–15, respectively. The ends of the conveyors 31–35 adjacent to the dryer, are pivotally connected to the dryer decks 11–15, respectively. The conveyors 31–35 are of the roller type and are driven from the same drive as are the rollers of the conveyors or decks of the dryer so that veneer thereon is moved to the dryer at the same speed at which the veneer moves through the dryer.

The infeed ends of the conveyors 31–35 converge toward the power actuated sheet advancing mechanism and are suspended by pairs of hanger bars 36, 37 from an overhead structure comprising two beams 40, 41 one at either side of the conveyors, and extending lengthwise thereof. The ends of the beams 40, 41 adjacent to the dryer are pivotally connected as by pivot pins 42, 43 to brackets 44, 45 secured to the dryer frame. The opposite ends of the beams 40, 41 are connected to and carried by sprocket chains 46, 47, respectively. One end of each of the sprocket chains 46, 47 is connected to the upper flange of the beam which it supports. From their respective beams, the chains reeve about sprocket wheel 50 keyed to a driven shaft 43 extending transversely of the apparatus and rotatably supported in suitable bearings on the top of the built-up frame of the feeding apparatus which frame is collectively designated by the reference character 52. From the sprocket wheels 50 the sprocket chains reeve about a second pair of sprocket wheels 53 keyed to a second transversely extending driven shaft 54 also supported in suitable bearings on top of the frame 52. The shafts 51 and 54 are connected so that they rotate in unison by a sprocket drive 55 connecting the rear ends of the shafts. From the sprocket wheels 53, the sprocket chains 46, 47 reach downwardly where they pass above pairs of idler sprocket wheels 59, 60 at the bottom of the frame 52 after which the chains reach upwardly and are connected to the lower sides of the beams 40, 41, respectively.

One of the shafts 51, 53 is adapted to be rotated as will be hereinafter more specifically described to raise and lower the right-hand ends of the conveyors 31-35 in predetermined manner so that veneer may be fed to the respective conveyors as they align with or pass by the discharge side of the sheet advancing mechanism. As shown, the vertically movable ends of the conveyors 31-35 are counterbalanced by a pair of counterweights 61, 62 located in the frame 52 adjacent to the opposite ends thereof and connected to the movable ends of the beams 40, 41 by sprocket chains 63, 64 reeved about suitable sprocket wheels supported on the top of the frame 52.

The usual practice is to bring the veneer to the dryer on trucks or the like and have workmen feed it into the various decks of the dryer by hand. As shown, stacks of veneer designated generally by the reference character V are brought to the feed-in end of the dryer A or more specifically to the infeed end of the feeding apparatus upon a roller conveyor designated generally as D. The end of the conveyor adjacent to the feeding apparatus is supported upon a scissors-type lift or elevatable mechanism E so that the top of a stack of veneer thereon can be aligned or approximately aligned with the pinch roll type sheet advancing mechanism and maintained so aligned as the height of the stack decreases. The scissors-type lift or elevatable mechanism E may be of any suitable type either manually or power operated, but preferably it is operated by power under the manual control of the operator. Lifts or elevatable mechanisms similar to those shown in United States patents to S. V. Trent, No. 900,237; T. E. De Vol, No. 1,405,301; and F. M. Reynolds, et al., No. 2,445,004 are suitable for the present purpose. Alternatively other types of lifts may be employed, for example, the pressure fluid actuated lift shown in United States patent to Sparks, No. 2,595,015. With the top of the stack of veneer on the conveyor aligned, or approximately aligned with the bite of the pinch rolls of the sheet advancing mechanism, the operator either standing upon the floor or upon a raised platform pushes the top piece of veneer of the stack into the sheet advancing mechanism. In the event the stacks of veneer are brought to the dryer on trucks, etc., the trucks with the veneer thereon or the veneer alone may be placed upon a suitable elevator or elevating means at the entrance side or end of the feeding apparatus.

In the apparatus illustrated the power operated sheet advancing mechanism comprises a pair of feed or pinch rolls 65, 66 one or both of which is driven and one of which is movable towards and from the other in timed relation to the movement of the adjacent ends of the conveyors 31-35 to sequentially advance sheets of veneer positioned therebetween by the operator to the conveyors. A stop 67 in the form of a channel extending across the feeding apparatus behind the pinch rolls 65, 66 limits the distance that the operator can pass the leading end of sheets of veneer past the pinch rolls. Guide plates or members 68, 69 extending transversely across the apparatus in front of the pinch rolls 65, 66 provide means for guiding or assisting in guiding the veneer into a position between the pinch rolls even though the top of the stack of veneer is not exactly aligned with the pinch rolls.

The pinch rolls 65, 66 and the guides 68, 69 etc., are supported in the frame 52 including right and left-hand vertical members, each formed of plates 75, 76, 77. The plates 76, 77 are connected to opposite edges of the plate 75 and extend outwardly therefrom. The side members are connected together by suitable bracing 78 and top plates 80, 81. The bottom pinch roll 65 is provided at its opposite ends with shaft-like projections 82 which project through circular openings in plates 75 of the frame 52, where they are supported in bearings 83 fixed to the plates. The shaft extension of the near end of the roll 65 projects beyond the bearing 83 and is adapted to be driven by a reversible electric motor 84 mounted on a plate 85 bolted to a plate 76 and operatively connected to the shaft 82 through a gear reduction unit 86 and a sprocket chain drive designated generally as 87.

The upper roll 66 of the feed rolls 65, 66 is, in construction, similar to the lower roll 65 and includes shaft-like extensions 90 projecting from opposite ends. In this instance, however, the shaft-like extensions project through elongated slots 91 in the plates 75 and are supported in suitable bearings 92 fixedly connected to the free ends of levers 93 pivoted intermediate their ends on stud shafts 94 secured in bosses on the plates 75. The near end of the roll 66 is adapted to be driven by a pair of gears 95, 96, the former of which is keyed to the right-hand end of the shaft 90 and the latter to the hub of a sprocket wheel 97 rotatably supported on the projecting end of the shaft 94. The sprocket wheel 97 is adapted to be driven from the shaft 82 by a sprocket chain 98 operatively connected to the sprocket wheel 97 and to a sprocket wheel 99 keyed to the shaft 82. The construction just described is such that the two pinch rolls 65, 66 are rotated at uniform speed by the motor 84. It is to be understood, however, that it is not necessary to drive both rolls and that the rolls need not be continuous.

In the embodiment shown the upper roll 66 is normally maintained in a raised position relative to the lower roll 65 by a spring 100 connected to the levers 93 and to the plate 80 and is moved in a direction toward the lower roll 65 by fluid pressure operated motors 101, one at either side of the apparatus. The cylinder assemblies of the motors 101 are pivotally connected to brackets 102 fixed to the plates 80 and the piston assemblies to the forwardly projecting ends of the arms or levers 93. The control for the supply of pressure fluid to the motors 101 will be hereinafter specifically referred to and is such that the motors 101 can be operated to control movement of the upper roll 66 toward and from the lower roll 65. During the operation of the feeding apparatus the upper roll 66 is periodically, automatically lowered in timed relation to the vertical movement of the in-feed ends of the conveyors 31-35 such that pieces of veneer, the ends of which have been pushed into the opening between the pinch rolls 65, 66 by the operator are fed to the respective conveyors as they align with the discharge side of the pinch roll. The conveyors feed or convey the veneers into the dryer A.

The stop 67 which, as previously stated, is in the form of a transversely extending channel member, is normally positioned in the path of veneer being pushed between the pinch rolls 65, 66 and limits the forward movement of the veneer as it is pushed forward by the operator. The stop or channel member 67 is fixedly connected to the rear ends of levers 103 pivotally connected intermediate their ends to the plates 75 by bolts 104. The oppositely extending, free ends of the arms 103 project underneath antifriction bearings 105 on the shaft-like part 90 of the upper roll 66 and when the upper roll is lowered, the engagement between the bearing members 105 and the ends of the levers 103 causes the levers 103 to be moved about their pivots 104 and the stop or channel member 67 raised out of the path of the veneer. Any suitable means, however, may be used to raise and lower the stop in timed relation to the actuation of the pinch roll feed mechanism.

In the embodiment shown in FIGS 1-6 the movable ends of the conveyors 31-35 are intermittently moved or indexed in an upward direction by a reversible electric motor 106 connected to the shaft 51 by a sprocket chain drive 107 to sequentially align them with the pinch roll feed mechanism and are rapidly returned to their lower positions after a sheet of veneer has been fed to the lower conveyor. The motor 106 and the motors 101 are intermittently operated in timed relation with respect to each other and the speed at which veneer is moved along the conveyors 31-35 by control mechanism including a timing unit 110 comprising a cam-operated switch 111. The unit 110 is connected by a sprocket chain drive 112 to one of the rollers of the upper deck 31 and since the rollers of all of the conveyors are driven at the same speed, the switch 111 is operated in timed relation to the speed of the conveyors. The unit 110 preferably contains means for adjusting the speed of its cam means relative to the speed of the conveyors to provide for the feeding of sheets of different length, etc.

The controls forming a part of the embodiment of the invention shown in FIGS. 1 to 6 will be described with reference to the following description of the operation of this embodiment.

Figure 6:
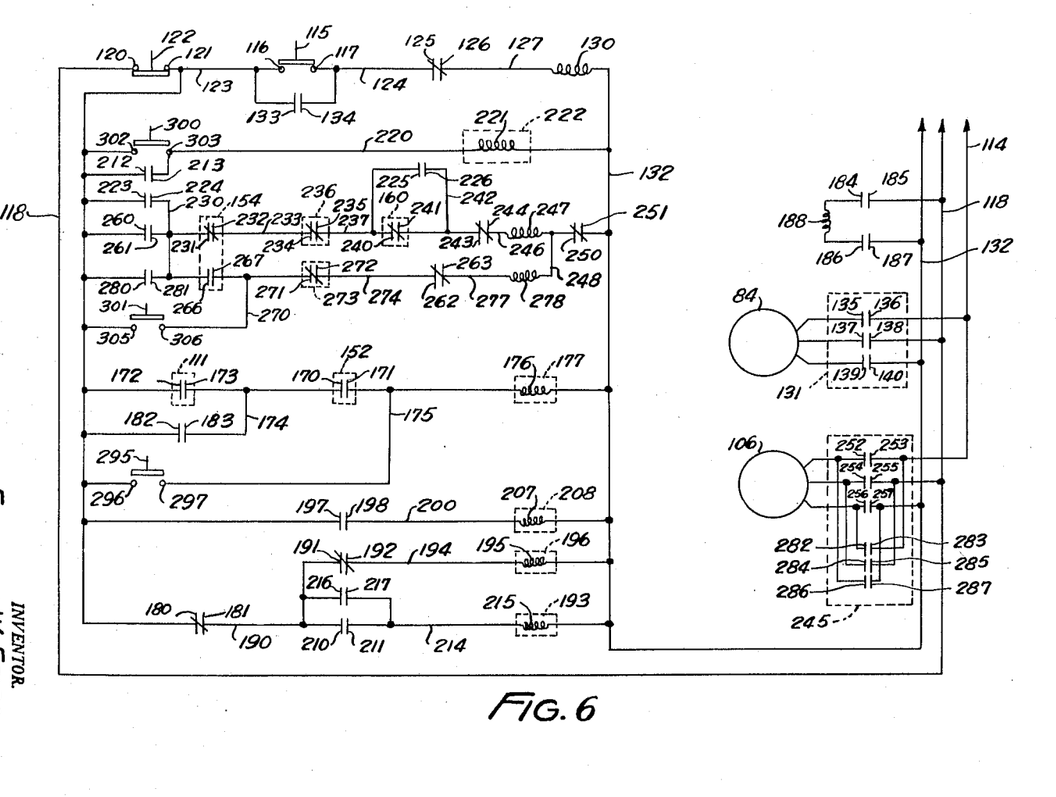
FIG. 6 is a schematic wiring diagram of the electrical circuits of the apparatus.

Referring to the wiring diagram, FIG. 6, the apparatus is placed in operation by the operator depressing a start push button switch 115 to close the normally open contacts 116, 117 thereof and establish a circuit from the power line 118 through the normally closed contacts 120, 121 of stop push button switch 122, wire 123, the now closed normally open contacts 116, 117 of start push button switch 115, wire 124, normally closed overload contacts 125, 126, wire 127, and operating solenoid 130 of motor controller 131 for motor 84 to power line 132. The overload contacts 125, 126, the operating solenoid 130 and the wire 127 are a part of motor controller 131 for the motor 84 which drives the pinch rolls 65, 66 of the feeding unit C. Energization of the operating solenoid 130 of the motor controller 131 closes the normally open contacts 133, 134, also forming a part of the motor controller, which establishes a holding circuit around the start push button switch 115 which switch may then be released. Energization of the operating solenoid 130 also closes the normally open contacts 135 and 136, 137 and 138, 139 and 140 connecting the motor 42 to the power lines 118, 132, 141 starting the motor 84 which, in turn, drives the pinch rolls 36, 70. The motor continues to operate until stopped by the operator depressing the stop push button switch 122 to open its normally closed contacts and break the holding circuit for the solenoid 130. The start and stop push button switches 115, 122 may be positioned at any convenient location about the machine.

With the conveyors 31–35 in operation, the switch 111 forming a part of the timing unit 110 will be periodically closed. Assuming that the sheets of veneer being fed to the dryer are eight feet long, the switch 111 is actuated to close its normally open contacts 150, 151 once for each travel of the conveyors of approximately 1.6 feet. In the preferred embodiment of the invention shown, however, the power operated pinch roll feed mechanism of the apparatus is not actuated or operated to feed a sheet of veneer to the power driven conveyor aligned therewith nor is the movable end of the conveyors moved relative to the pinch rolls to bring a succeeding deck into feeding position upon each closing of the timing or cycle switch 111. This sequence of operations takes place only if there is a sheet of veneer between the pinch rolls, that is, in position to be fed to the respective deck then aligned with the pinch rolls. This is accomplished by a limit switch 152 carried by the guide plate 69 and adapted to be actuated by a downwardly projecting leaf-like member for feeler 153. The lower end of the member 153 projects into the path of the veneer immediately in front of the feed rolls 65, 66 and as a sheet of veneer is pushed between the rolls the member 153 is rotated in a clockwise direction to close the switch 152 which is in series circuit with the switch 111. The switch 152 and the operating mechanism therefor can be eliminated, if desired. In this event, however, the pinch rolls 65, 66 will be actuated and the conveyors 31–35 will index in a predetermined cycle upon each actuation of the timing switch 111 regardless of whether or not a sheet of veneer is in feeding position in the power operated pinch roll feed mechanism.

The bottom and top positions of the conveyors 31–35 are controlled by a direction selector switch 154 carried by the frame 52 and positioned to be engaged by bottom and top adjustable stops 155, 156 connected to a rod or member 157 carried by the movable ends of the conveyors. The intermediate rest positions of the movable end of the conveyors are controlled by a limit switch 160 fixed to the frame 52 and adapted to be actuated by adjustable stops 161, 162 and 163 on a vertically positioned rod 164 connected to the movable end of the conveyors in a suitable manner.

Referring again to the wiring diagram, as the operator pushes a sheet of veneer between the pinch rolls 65, 66, the veneer actuates the limit switch 152 to close its normally open contacts 170, 171; however, nothing happens until the cycle start switch 111 is operated to close its normally open contacts 172, 173. The closing of the normally open contacts 171, 172 of switch 111 establishes a circuit from the line 118 through the normally closed contacts 120, 121 of stop switch 122, wire 123, now closed contacts 172, 173 of switch 111, wire 174, now closed contacts 170, 171 of switch 152, wire 175, and operating solenoid 176 of relay 177 to line 132. The relay 177 may be of the delayed opening type if desired to give better control over the proper spacing of the sheets of veneer in the conveyors 31–35 and in turn the dryer A.

Energization of operating solenoid 176 of relay 177 opens its normally closed contacts 180, 181 and closes its normally open contacts 182 and 183, 184 and 185, 186 and 187. The opening of the normally closed contacts 180, 181 break a holding circuit for a relay hereinafter referred to. The closing of the normally open contacts 182, 183 of relay 177 establishes a holding circuit for the relay from the wire 123 to the wire 174 around contacts 172, 173 of cycle switch 111 which may then open. The closing of the normally open contacts 184–187 of relay 177 connects the operating solenoid 188 of the solenoid valve which controls the flow of pressure fluid to and from the motors 101 to cause the valve to admit pressure fluid to the bottom of the motors and move the top roll 66 into engagement with the veneer therebeneath and above the bottom roll 65. Simultaneously with the movement of the upper roll 66 into engagement with the veneer therebeneath, the stop 67 is raised allowing the sheet of veneer to be fed by the feed rolls 65, 66 onto the conveyor aligned therewith.

The rolls 65, 66 continue to feed the veneer to the conveyor until the switch 152, which has been held closed by the engagement of the member or feeler 153 with the veneer, is operated to allow its then closed contacts 170, 171 to open by the trailing end of the veneer passing out from underneath the member or feeler 153. The opening of the contacts 170, 171 of switch 152 breaks the circuit to the operating solenoid 176 of relay 177, deenergizing the operating solenoid 188 of the solenoid valve allowing the pressure fluid to be exhausted from the motors 101 whereupon the top roll 66 raises to its inoperative position and the stop 67 returns to its lower operative position. Alternatively, the holding contacts 182, 183 of relay 177 and switch 152 can be omitted and the circuit for operating solenoid 176 of relay 177 maintained for the desired feeding interval or period by use of a suitable long operating cam for the switch 111, because with switch 152 omitted the solenoid 176 of relay 177 will remain energized as long as switch 111 is held closed. As a further alternative arrangement a delayed opening timing switch can be used in place of the veneer controlled switch 152 for maintaining the relay 177 energized for the desired feeding period. The veneer is fed into the conveyors 31–35 at a considerably higher speed than that at which the conveyors travel since the five conveyors are fed successively.

Simultaneously with the opening of contacts 182–187 of relay 177, the normally closed contacts 180, 181 thereof reclose. This reestablishes a circuit from the wire 123 through the now closed contacts 180, 181 of relay 177, wire 190, normally closed contacts 191, 192 of relay 193, wire 194 and operating solenoid 195 of relay 196 to line 132. Energization of the operating solenoid 195 of relay 196 closes its normally open contacts 197, 198, establishing a circuit from the wire 123 through the contacts 197, 198, wire 200, and operating solenoid 207 of relay 208 to line 132. Energization of the operating solenoid 207 of relay 208 closes its normally open contacts 210 and 211, 212 and 213. The closing of the normally open contacts 210, 211 of relay 208 establishes a circuit from the wire 123 through the now closed contacts 180, 181 of relay 177, wire 190, now closed contacts 210, 211 of relay 208, wire 214 and operating solenoid 215 of relay 193 to line 132. The energization of the operating solenoid 215 of relay 193 closes the normally open contacts 216, 217 thereof and opens its normally closed contacts 191, 192. The closing of contacts 216, 217 establishes a holding circuit around the contacts 210, 211 of relay 208 from the wire 190 to the wire 214 and the opening of the normally closed contacts 191, 192 of relay 193 deenergizes the operating solenoid 195 of relay 196 allowing its normally open contacts 197, 198 to open which, in turn, deenergizes the operating solenoid 207 of relay 208.

The circuits referred to in the preceding paragraph may be omitted if desired and the contacts 212, 213 transferred to a cam controlled switch in the synchronizing unit 110 operated in timed relation to the switch 111, either before or after the operation of the switch 111.

The closing of normally open contacts 212, 213 of relay 208 establishes a circuit from the wire 123 through wire 220, and operating solenoid 221, of relay 222, to line 132 closing its normally open contacts 223, 224 and 225, 226. Assuming that the movable ends of the conveyors 31–35 are in any position other than the top position, the closing of contacts 223, 224 and 225, 226 of relay 122 establishes a circuit from the wire 123 through the now closed contacts 223, 224, wire 230, now closed contacts 231, 232 of direction selecting switch 154, wire 233, normally closed contacts 234, 235 of up travel, safety limit switch 236, wire 237, now closed contacts 225, 226 of relay 222 or normally closed contacts 240, 241 of index switch 160 connected to the frame of the feed unit C, wire 242, interlock contacts 243, 244 of motor controller 245, wire 246, operating solenoid 247 of motor controller 245, wire 248, and overload contacts 250, 251 also of motor controller 245 to line 132. Energization of the operating solenoid 247 of motor controller 245 closes the normally open contacts 252 and 253, 254 and 255, 256 and 257, 260 and 261 and opens the normally closed contacts 262 and 263. The closing of the normally open contacts 252–257 of motor controller 245 connects the hoist motor 106 to the power lines 118, 132, 114 so that it operates in a direction to raise the vertically movable ends of the conveyors 31–35. The closing of the normally open contacts 260, 261 of motor controller 245 establishes a holding circuit for the operating solenoid 247 thereof around the contacts 223, 224 of relay 222 from the wire 123 to the wire 230. The relay 196 may be of such a character, if necessary or desired, that the opening of contacts 197, 198 is delayed a short interval upon deenergization of its operating solenoid 195 to assure movement of the stop 161, 162 or 163 away from switch 160, assuming that the conveyors 31–35 are in their second, third or fourth positions from the bottom, before contacts 212, 213, reopen to deenergize relay 222 and reopen contacts 223, 224.

The motor 106 continues to operate and the infeed ends of the conveyors to raise until limit or index switch 160, which is connected to the frame 52 is opened by the next one of the stops 161, 162, 163 carried by the rod 164 to actuate the switch 160, there being one such stop for each of the intermediate conveyors 32, 33, 34, or until the direction selector switch 154 is tripped by the stop 155. The opening of the normally closed contacts 240, 241 of index switch 160 breaks the circuit for the operating solenoid 247 of the motor controller 245 causing the motor to stop and a solenoid release brake associated therewith to be applied. The movable ends of the conveyors are now in position to have a sheet of veneer fed to the conveyor with which the discharge side of the pinch rolls 65, 66 are now aligned.

The cycle of operations just described is repeated by the switch 111 being again operated by the timing mechanism provided another sheet of veneer has been advanced to a position between the pinch rolls 65, 66 and underneath the member or feeler 153. As the vertically movable ends of the conveyors reach the position wherein the bottom deck 35 is in alignment with the pinch rolls 65, 66, the adjustable stop 155 operates the direction selecting switch 154 to open its normally closed contacts 231, 232 and to close its then open contacts 266, 267. The opening of the previously closed contacts 231, 232 deenergizes the operating solenoid 247 of the motor controller 145 and stops the motor 106.

With the movable ends of the conveyors in their up position and the switch 152 closed by a piece of veneer, upon the next closing of the sequence switch 111 and the resulting closing of the normally open contacts 212, 213 of relay 208, as previously described, a circuit is established which causes the hoist motor 106 to operate in a direction to lower the vertically movable ends of the conveyors to their down position; that is, with the top deck 31 in alignment with the feed rolls 65, 66. With the direction selecting switch 154 in the position just referred to, the closing of the normally open contacts 212, 213 of relay 208 establishes a circuit from the wire 123 through the now closed contacts 212, 213, wire 220, operating solenoid 221 of relay 222 to line 132 closing its normally open contacts 223, 224, establishing a circuit from the wire 123 through now closed contacts 223, 224, wire 230, now closed contacts 266, 267 of selecting switch 154, wire 270, normally closed contacts 271, 272 of down travel safety limit switch 73, wire 274, normally closed interlock contacts 262, 263 of motor controller 245, wire 277, operating solenoid 278 of motor controller 245, wire 248, and overload contacts 250, 251 to line 132, thereby energizing the solenoid 278 and closing the normally open contacts 280 and 281, 282 and 283, 284 and 285, 286 and 287 and opening the normally closed interlock contacts 243, 244 of motor controller 245. The closing of normally open contacts 280, 281 establishes a holding circuit for the operating solenoid 278 around the contacts 223, 224 of relay 222 before the relay opens from the wire 123 to the wire 230.

The closing of the normally open contacts 282–287 of motor controller 245 connects the hoist motor 106 to the power lines 118, 132, 114 in such a manner that the motor rotates in a direction to lower the vertically movable ends of the conveyors 31–35. The motor continues to operate and the conveyor assembly to descend until the assembly reaches its down position, at which time the direction selecting switch 154 is operated by the stop 156 to open its contacts 266, 267 and deenergize the operating solenoid 278 and stop the motor. Operation of the selecting switch 154 to open the contacts 266, 267 thereof causes contacts 231, 232 of the switch to subsequently close and reestablish the circuit so that the hoist motor 106 will be operated in the reverse direction; that is, in the direction to raise the vertically movable ends of the conveyors upon the next closing of the normally open contacts 212, 213 of relay 208 upon the subsequent actuation of the switch 111. The cycle of operations continues with the feeding apparatus delivering veneer to the decks of the dryer in sequence as long as the machine is continued in operation and veneer is introduced between the pinch rolls 65, 66.

Provision is made for manually controlling the dropping of the upper roll 66 in the form of a push button switch 295 comprising normally open contacts 296, 297, the closing of which establishes a circuit from the wire 123 through the contacts 296, 297, wire 175, and operating solenoid 176 of relay 177 to the line 132.

The operator may raise and lower the vertically movable ends of the conveyors 31–35 at any time by depressing the proper manually operable up and down push button switches 300, 301, respectively. Depressing up push button switch 300 closes its normally open contacts 302, 303 establishing a circuit from the wire 123 through the now closed contacts 302, 303, wire 220, operating solenoid 221 of relay 222 to line 132, closing the normally open contacts 223, 224 and 225, 226 of relay 222. The closing of these contacts establishes a circuit from the wire 123 through the now closed contacts 223, 224, wire 230, contacts 231, 232 of direction selector switch 154, which contacts are normally closed, wire 233, normally closed contacts 234, 235 of overtravel limit switch 236, wire 237, now closed contacts 225, 226 or normally closed contacts 240, 241 of index switch 160 which contacts are in parallel circuit with one another, wire 242, normally closed contacts 243, 244 of motor controller 245, wire 246, operating solenoid 247 of motor controller 245, wire 248, and normally closed overload contacts 250, 251 of motor controller 245 to line 132. Energization of the operating solenoid 247 of motor controller 245 connects the motor 106 to the power lines in such a manner that the motor rotates in a direction to raise the vertically movable ends of the conveyors. Simultaneously with the closing of the contacts 252–257, normally, open contacts 260, 261 on the motor controller 245 close establishing a holding circuit for the operating solenoid for the motor controller, and normally closed contacts 262, 263 on the motor controller are opened eliminating any possibility of the motor being accidentally connected to the power lines for rotation in an opposite direction. The motor 56 continues to rotate in a direction to raise the conveyors, etc., until the stop switch 122 is depressed or one of the switches 154, 160 opens. The contacts 225, 226 of relay 222 are in parallel circuit with the normally closed contacts 240, 241 of index switch 160 to assure operation of the motor 106 upon energization of relay 222 even though switch 160 is held open at the time by one of the adjustable stops or trips, 161, 162 or 163. If there is sufficient overtravel or overrun of the motor to move the stops past the index switch 160 contacts 225, 226 of relay 222 may be omitted. As previously mentioned the direction selector switch 154 is normally in the position shown in the wiring diagram but if, for some reason, it happens to be in the other of the two positions at the time the up push button switch 300 is depressed the movable ends of the conveyors will merely move to their down position and upon subsequent operation of the up switch 300 it will operate as explained above.

The motor 106 is operated in the opposite direction to lower the vertically movable end of the conveyors 31–35 by the operator momentarily depressing the down push button switch 301 to close its normally open contacts 305, 306, thereby establishing a circuit from the wire 123 to the wire 270 etc., energizing the operating solenoid 278 of motor controller 245 and connecting the hoist motor 106 to the power lines for rotation in the opposite direction; that is, in a direction to lower the movable ends of the conveyors. Simultaneously with the closing of the contacts 282–287, normally open contacts 280, 281 are closed to establish a holding circuit for operating solenoid 278 of the motor controller 245 and normally closed contacts 243, 244 in series with the up operating solenoid 247 of the motor controller are opened thus preventing any possibility of the motor 106 being connected to the power lines for operation in the reverse direction. The motor continues to operate until the stop push button switch 122 is depressed or the limit switch 273 is operated to open its normally closed contacts 271, 272.

Figure 7:
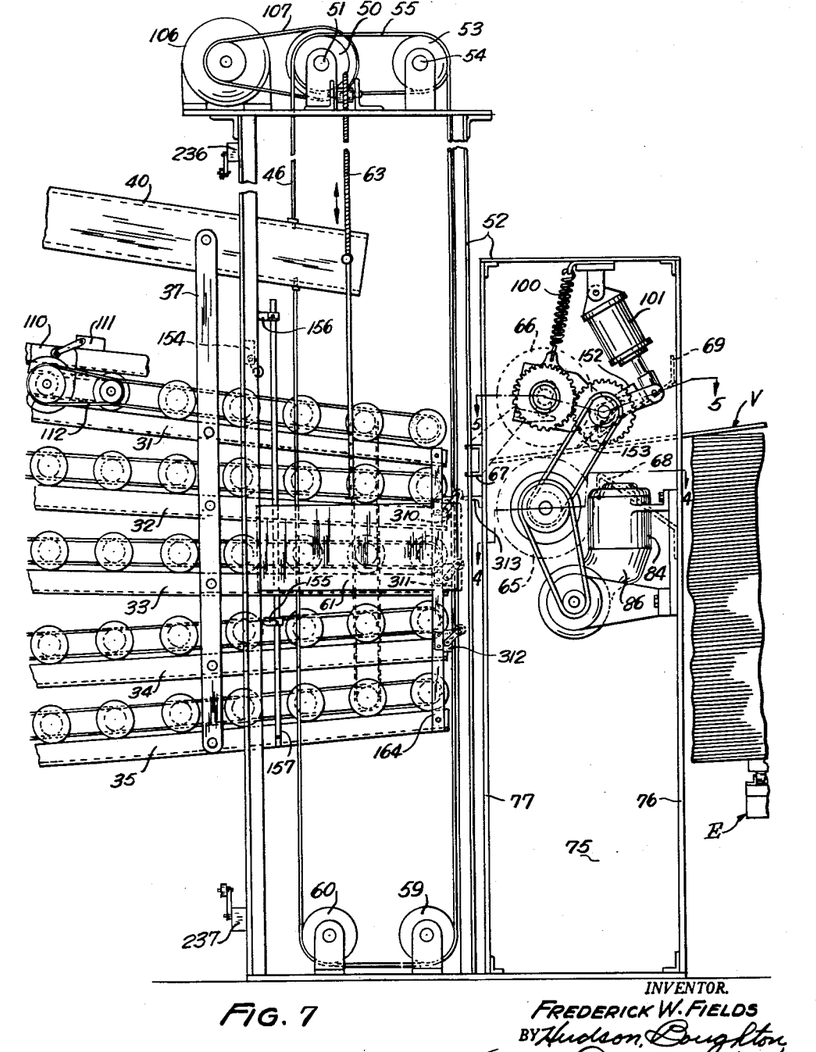
FIGS. 7 and 8 are views similar to FIGS. 3 and 6 but showing a modified construction.
Figure 8:
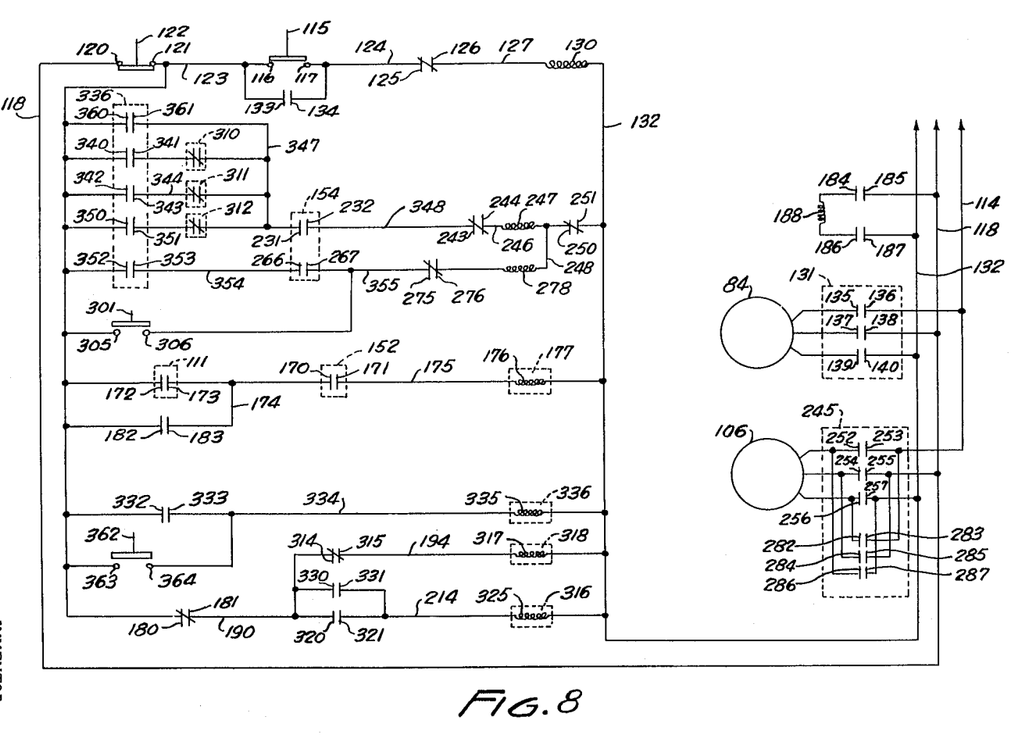

The embodiment of the invention shown in FIGS. 7 and 8 is similar to that shown in FIGS. 1 to 6 with the exception of the control for effecting the relative movement between the infeed ends of the conveyors 31–35 and the power operated pinch roll feeding mechanism, and the duplicate parts are designed by the same reference characters.

As distinguished from the arrangement employed in the embodiment shown in FIGS. 1 to 6, where the indexing and return movements of the conveyors 31–35 are initiated by the closing of a pair of relay contacts 223, 224, the controls of the embodiment shown in FIGS. 7 and 8 includes a stepping switch for initiating the indexing and return movements of the conveyors. The only physical change in the outside appearance of the machine is the substitution of normally closed limit switches 310, 311, 312 for the stops or trips 161, 162, 163, respectively, of the first embodiment, and the substitution of a stop or trip 313 for actuating the switches 310, 311 312 in place of the index switch 160 of the earlier embodiment. The switches 310, 311, 312 are adjustably connected to the rod or member 164 in a manner similar to that in which the stops or trips 161, 162, 163 are connected thereto in the first embodiment.

The controls of the embodiment shown in FIGS. 7 and 8 will be described in connection with the operation of this embodiment. Only those parts, however, which are different than those previously described will be specifically mentioned. It being understood that the parts not mentioned, for example, the drive for the rolls 65, 66 are the same as in the first embodiment.

Referring particularly to the wiring diagram, FIG. 8, and assuming that the motor 84 is operating and that conveyors 31–35 are operating, the operating solenoid 176 of relay 177 will be periodically energized and deenergized as previously explained. The relay 177 may be of the delayed opening type if desired.

The deenergization of relay 177 allows its contacts 180, 181 to reclose thereby establishing a circuit from the wire 123 through the now closed contacts 180, 181 of relay 177, wire 190, normally closed contacts 314, 315 of relay 316, wire 194 and operating solenoid 317 of relay 318 to line 132. Energization of relay 318 closes its normally open contacts 320, 321, establishing a circuit from the wire 123 through contacts 180, 181, wire 190, contacts 320, 321, wire 214 and operating solenoid 325 of relay 316 to line 132. Energization of the operating solenoid 325 of relay 316 closes its normally open contacts 330 and 331, 332, and 333 and opens its normally closed contacts 314, 315. The closing of contacts 330, 331 establishes a holding circuit around the contacts 320, 321 of relay 318 from the wire 190 to the wire 214 and the opening of the normally closed contacts 314, 315 of relay 316 deenergizes relay 318 allowing its normally open contacts 320, 321 to open.

The closing of normally open contacts 332, 333 of relay 316 establishes a circuit from the wire 123 through the contacts 332, 333, wire 334 and operating solenoid 335 of a stepping switch 336 to line 132. Assuming that the parts are in the approximate respective positions shown in FIG. 7 and that the feeding of conveyor 32 has just been completed, contacts 340, 341 of stepping switch 336 are closed, limit switch 310 is open being on the stop 177. Under these conditions the energization of solenoid 335 of stepping switch 336 opens contacts 340, 341 and closes the next set of contacts 342, 343. The closing of contacts 342, 343 establishes a circuit from the wire 123, through now closed contacts 342, 343, wire 344, normally closed limit switch 311, wire 347 now closed contacts 231, 232 of selecting switch 154, wire 348, normally closed interlock contacts 243, 244 of motor controller 245, wire 246, operating solenoid 247 of motor controller 245, wire 248 and overload contacts 250, 251 of motor controller 245 to line 132.

Energization of the operating solenoid 247 of motor controller 245 connects the hoist motor 106 to the power lines so that it operates in a direction to raise the vertically movable ends of the conveyors 31–35. The motor continues to operate and the conveyors 31–35 to raise until limit switch 311 which is connected to the member 164 is opened by the stop or trip 313 carried by the frame 52. The opening of limit switch 311 breaks the circuit for the operating solenoid 247 of the motor controller 245 causing the motor to stop and the solenoid release brake associated therewith to be applied. The movable ends of the conveyors are now in position to have a sheet of veneer fed to the next succeeding conveyor 33 with which the feed rolls 65, 66 are now aligned.

The cycle of operations is repeated upon each energization of relay 177, as by the closing of the contacts 172, 173 of the cycle switch 111, provided the leading end of a sheet of veneer has been advanced to a position between the feed rolls 65, 66.

As the vertically movable ends of the conveyors 31–35 reaches the position wherein the bottom conveyor 35 is in alignment with the feed rolls 65, 66, the stop 155 operates the direction selecting switch 154 to open its previously closed contacts 231, 232 and close its then open contacts 266, 267. The opening of contacts 231, 232 deenergizes the operating solenoid 247 of the motor controller 245 and stops the motor 106. Upon the next operation of the stepping switch 336 the then closed contacts 350, 351, which had closed upon the indexing of the conveyors into position to feed conveyor 34, open and contacts 252, 253 close, establishing a circuit from the wire 123 through now closed contacts 352, 353, wire 354, now closed contacts 266, 267 of direction selecting switch 154, wire 355, interlock contacts 275, 276 of motor controller 245, wire 277, operating solenoid 278 of motor controller 245, wire 248, overload contacts 250, 251 to line 132. The energization of operating solenoid 278 of motor controller 245 connects the hoist motor 106 to the power lines such that the motor is caused to operate in a direction to lower the vertically movable ends of the conveyors to their bottom position; that is, with its upper conveyor 31 in alignment with the feed rolls 65, 66.

The motor 56 continues to operate and the conveyor assembly to descend until the assembly reaches the lower position, at which time the direction selecting switch 154 is operated by the stop 156 to open contacts 266, 267 thereof and deenergize the operating solenoid 278 and stop the motor. Operation of the selecting switch 154 to open its contacts 266, 267 causes contacts 231, 232 of the switch to close and re-establish the circuit so that the hoist motor 106 will be operated in the reverse direction; that is, in the direction to raise the vertically movable ends of the conveyors 31–35 upon the next actuation of the stepping switch at which time contacts 352, 353 thereof are opened and contacts 360, 361 are closed. The cycle of operations continues with the feeding apparatus delivering veneer to the decks of the dryer in sequence as long as the machine is continued in operation and veneer is introduced between the pinch rolls 65, 66 of the feed mechanism.

Provision is made for manually controlling the movement of the conveyor assembly comprising the conveyors 31–35 in the form of a push button switch 362 comprising normally open contacts 363, 364, the closing of which establishes a circuit from the wire 123 through the contacts 363, 364, wire 334 and operating solenoid 335 of relay 336 to the line 132. This causes the switch to close its next succeeding pair of contacts and the next succeeding conveyor to be placed in feeding position.

Figures 9, 10:
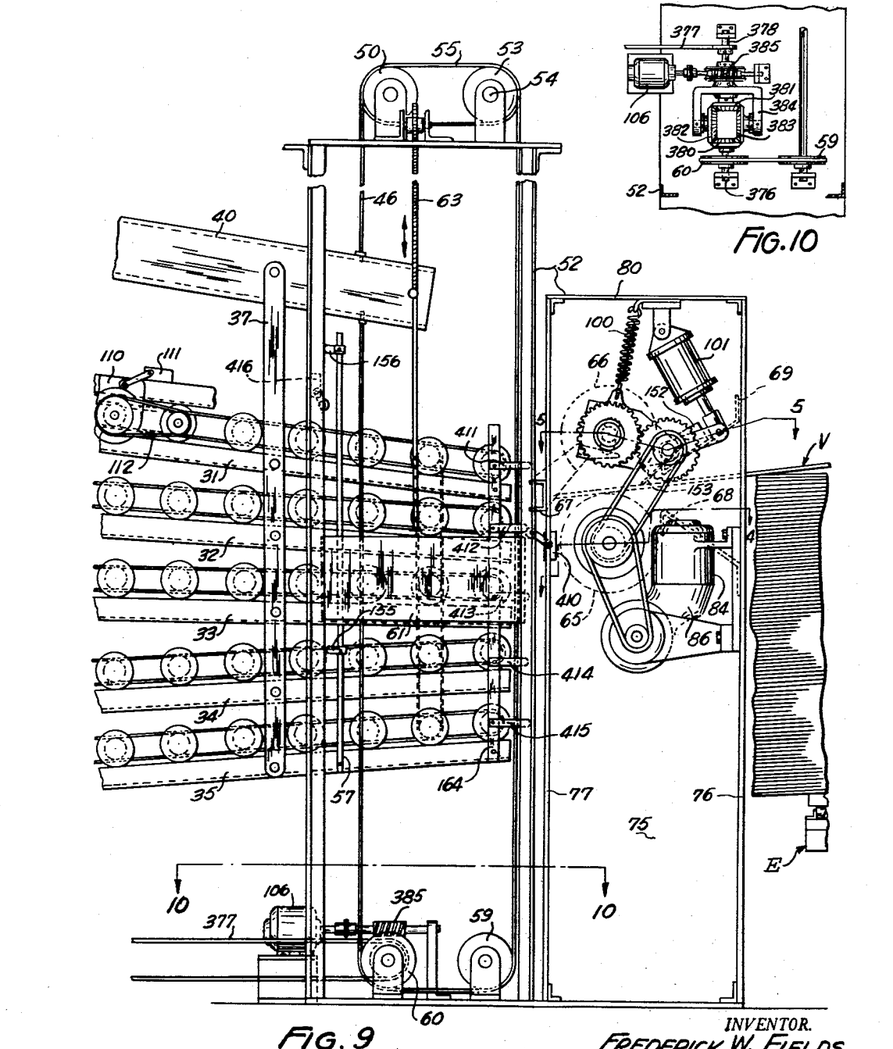
FIGS. 9 and 11 are further views similar to FIGS. 3 and 6 but showing a further modified embodiment of the invention.
FIG. 10 is a sectional view approximately on the line 10—10 of FIG. 9.
Figure 11:
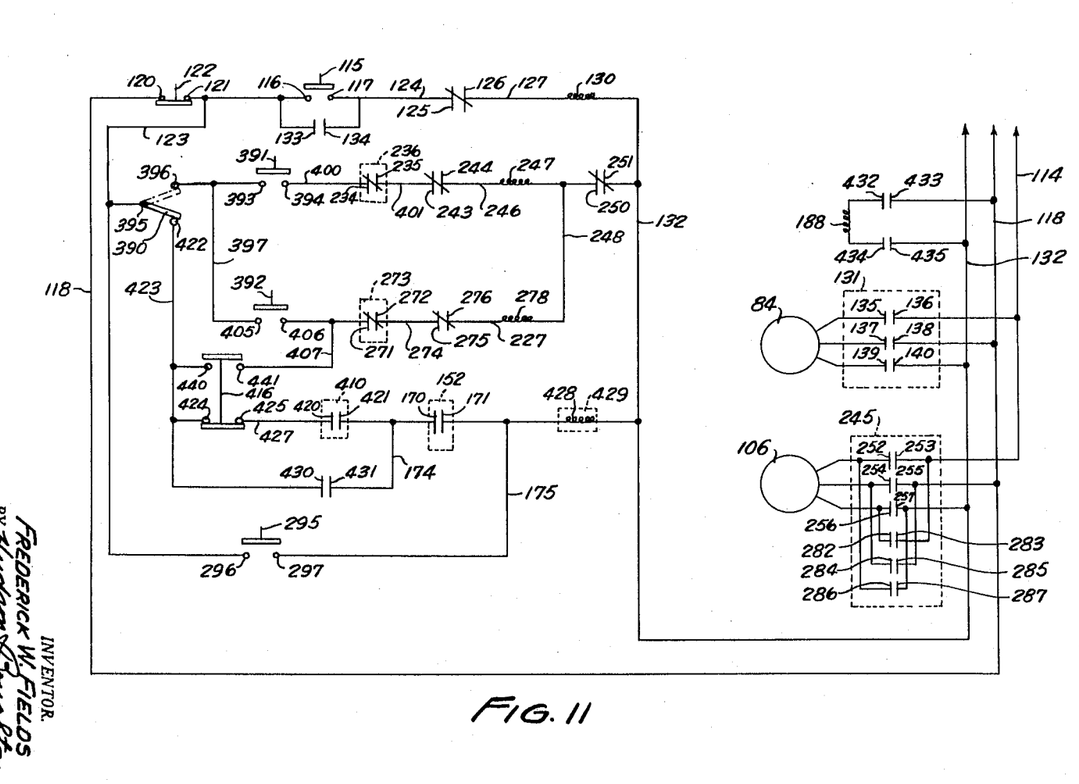
Figure 12:
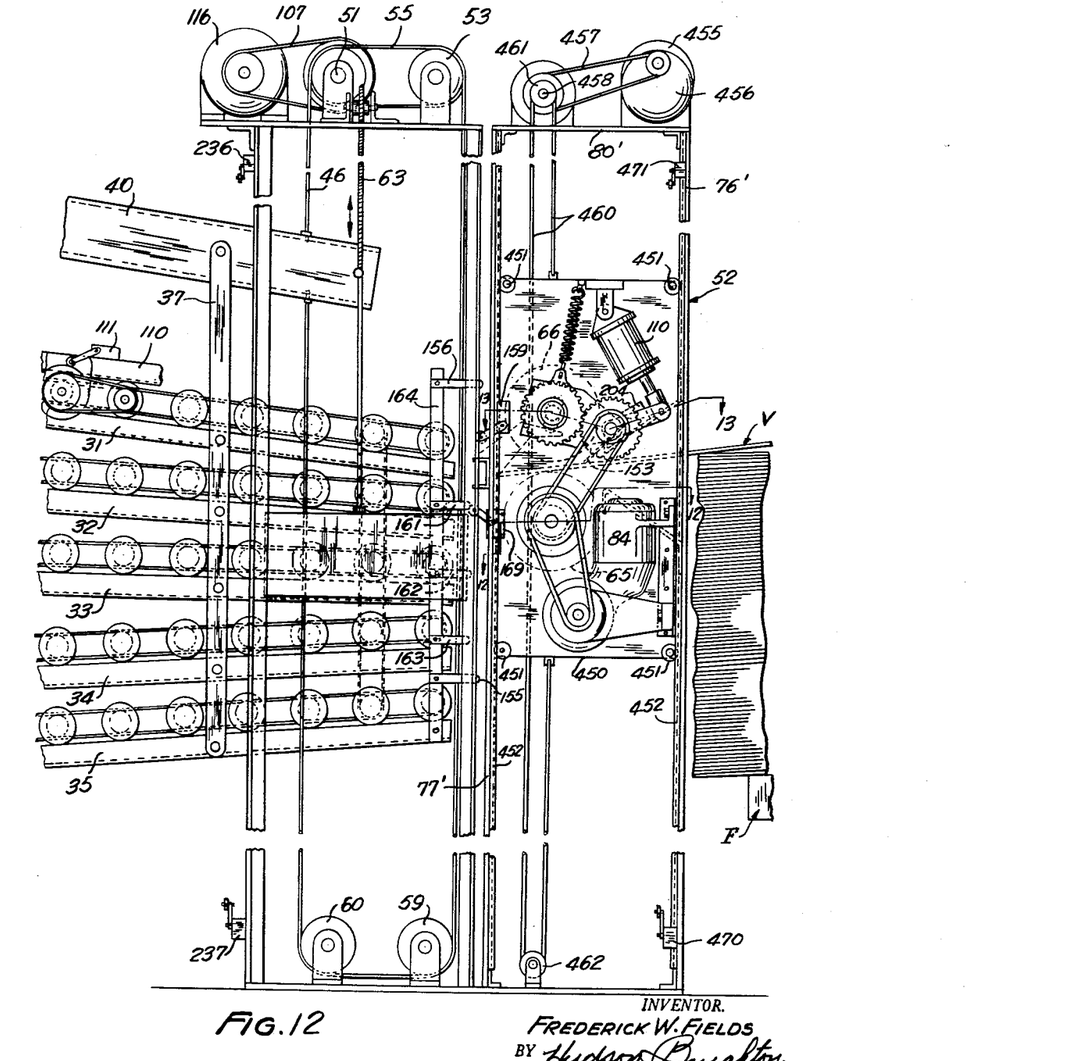
FIGS. 12 to 14 are views similar to FIGS. 3 to 5 but showing a still further modified embodiment of the invention.
Figure 13:
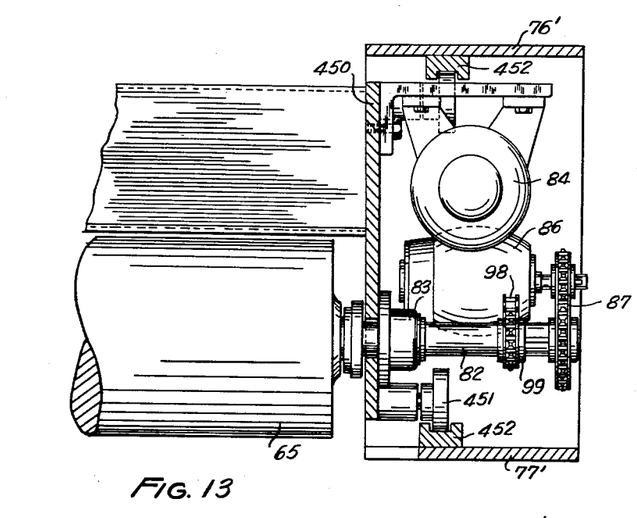
Figure 14:
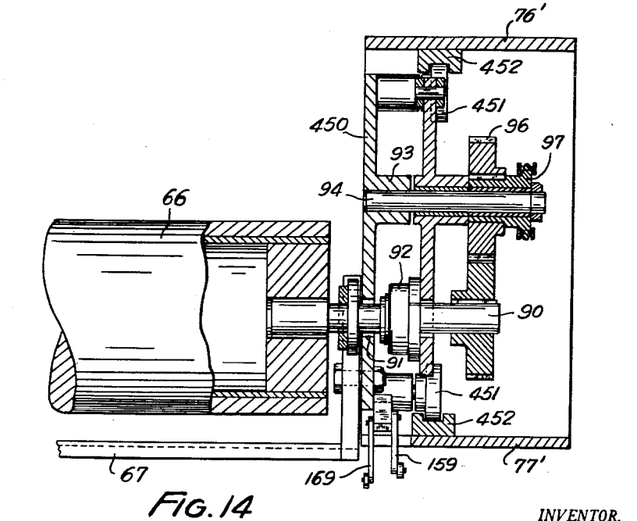

The embodiment of the invention shown in FIGS. 9, 10 and 11 is similar to that shown in FIGS. 1 to 6 except that the movable ends of the conveyors 31–35, instead of being intermittently moved from one position to another so that they can be sequentially loaded, are continuously moved and the pinch roll mechanism is periodically actuated in timed relation to their movement in such a manner that the conveyors are sequentially fed as they align with and pass by the discharge side of the pinch rolls. This, of course, requires certain changes in the hoist mechanism and the controls of the apparatus. The parts of the feeding apparatus shown in FIGS. 1 to 6, which are duplicated in FIGS. 9, 10 and 11 are designated by the same reference characters.

As distinguished from the arrangement employed in the embodiment shown in FIGS. 1 to 6 wherein the vertical movement of the movable ends of the conveyors 31–35 is effected by relative operation of a hoist motor 106, in the embodiment shown in FIGS. 9, 10, 11 the drive for the vertical movement of the conveyors during the loading cycle is taken from the motor 16 which drives the dryer and during the return movement the drive is effected by the electric motor 106 which has been moved from the top of the frame 52 to the bottom and connected to the hoist mechanism in a manner hereinafter described. As in the other embodiments the conveyors are loaded as they move vertically upwardly at a relatively slow rate of speed and they are returned to their down position at a rapid rate of speed by the motor 106. The changes in the embodiment shown in FIGS. 9, 10 and 11, over the embodiment shown in FIGS. 1 to 6 will be referred to in connection with the following description of the operation of this embodiment. It is to be understood that the parts not specifically mentioned are the same as in the first embodiment.

Referring to FIGS. 9, 10 and 11 the near and far sprocket wheels 60 at the lower end of the frame 52 and about which the chains 46 are reeved are not fixed to a single shaft as they are in FIGS. 1 to 6, but are fixed to separate aligned shafts so as to provide space for a planetary drive within the lower end of the frame 52. The front or rear wheel 60 is keyed to a shaft 376 rotatably supported in suitable bearings in the frame 52 and is adapted to be alternatively driven in opposite directions and at different speeds to move the movable ends of the conveyors 31–35 in an upwardly direction at a relatively slow rate of speed to move or continuously index the conveyors successively from top to bottom past a feed-out or discharge side of the rolls 65, 66 and to thereafter quickly return the conveyors to their lower position. In order to maintain a relationship between the speed of the conveyors and their vertical movement during the loading part of the cycle, the shaft 376 is preferably driven to move the conveyors in their upwardly or indexing direction from the motor 16 through a variable speed transmission not shown and a sprocket chain drive designated generally as 377. As shown, the drive 377 is connected to a shaft 378 in alignment with the shaft 376 which carries the near sprocket wheel 60, and is connected to the shaft 376 by two bevel gears 380, 381 fixed to the adjacent ends of the shafts 376, 378 and operatively connected to one another by bevel gears 382, 383. The gears 382, 383 are rotatably supported on short shafts fixed in a cage member 384 rotatably supported on the shaft 378 and are adapted to be selectively driven through a locking worm wheel and worm drive 385 by the reversible motor 106. The drive 377, as previously stated, preferably includes a conventional infinitely variable change speed transmission or mechanism (not shown) so that the speed of the vertical movement of the conveyors in an upwardly direction can be varied or regulated relative to the speed of the conveyors. As the movable ends of the conveyors are raised veneer is fed to the respective conveyors as they align with or pass by the discharge side of the pinch roll mechanism. To return the conveyors from their top to their bottom position the motor 106 is operated to overdrive the constant slow speed of the bevel gear 381.

The vertically movable end of the conveyors 31–35 may be manually raised or lowered, as may be desired in setting up the apparatus, by setting a two-position selecting switch 390 in its manual position as distinguished from its automatic position and closing the appropriate normally open up or down push button switches 391, 392, respectively. Closing normally open up push button switch 391 closes its normally open contacts 393, 394 establishing a circuit from the wire 123 through the now closed contacts 395, 396 of selecting switch 390, wire 397, contacts 393, 394 of up switch 391, wire 400, normally closed contacts 234, 235 of overtravel limit switch 236, wire 401, normally closed contacts 243, 244 of motor controller 248, wire 246, operating solenoid 247 of motor controller 245, wire 248, and normally closed overload contacts 250, 251 of motor controller 245 to line 132. Energization of the operating solenoid 247 of motor controller 245 connects the motor 106 to the power lines in such a manner that the motor rotates in a direction to raise the vertically movable end of the feed section B. The motor 106 continues to rotate in a direction to raise the conveyors as long as up switch 391 is held closed or until the overtravel limit switch 236 opens.

The motor 106 is operated in the opposite direction to lower the vertically movable ends of the conveyors by closing the down push button switch 392 to close its normally open contacts 405, 406 thereby establishing a circuit from the wire 123 through the contacts 395, 396 of selecting switch 390, wire 397, contacts 405, 406 of down push button switch 392, wire 407, normally closed contacts 271, 272 of overtravel limit switch 273, wire 274, normally closed contacts 275, 276 of motor controller 245, wire 277, operating solenoid 278 of motor controller 245, wire 248, and overload contacts 250, 251 to line 132. Energization of the operating solenoid 278 connects the traverse motor 106 to the power lines for rotation in the opposite direction; that is, in a direction to lower the movable end of the conveyors. The motor continues to operate as long as the switch 392 is held closed or until the overtravel limit switch 273 is operated to open its normally closed contacts 271, 272.

With the selecting switch 390 on its automatic position the conveyors will be continuously reciprocated to move the entrance ends thereof past the feed rolls 65, 66. The decks are moved upwardly past the rolls 65, 66 at a relatively slow speed by the motor 16 and as they reach predetermined positions a normally open switch 410 on the frame 52 is successively closed by adjustable stops or trips 411, 412, 413, 414, 415, one for each of the conveyors 31–35, respectively, carried by the rod or bar 164 fixed to the movable ends of the conveyors. Upon each operation of the switch 410, the top roll 66 is lowered to engage the top of a sheet of veneer pushed thereunder by the operator and a feeding operation executed.

The top and bottom limits of movement of the conveyors 31–35 are controlled by an on-off switch 416 carried by the frame 52 and positioned to be engaged by the top and bottom adjustable stops 155, 156 on the member 157 carried by the movable ends of the conveyors.

Referring again to the wiring diagram, as the operator pushes a sheet of veneer between the pinch rolls 65, 66 and into engagement with the stop 67, the veneer actuates the limit switch 152 to close its normally open contacts 170, 171; however, nothing happens until one of the trips 411–415 operates the switch 410 to close its normally open contacts 420, 421. The closing of the normally open contacts 420, 421 of switch 410 establishes a circuit from the wire 123 through the now closed contacts 395, 422 of selecting switch 390, wire 423, normally closed contacts 424, 425 of the on-off switch 416, wire 427, now closed contacts 420, 421 of switch 410, wire 174, contacts 170, 171 of switch 152, wire 175, and operating solenoid 428 of relay 429 to line 132.

Energization of operating solenoid 428 of relay 429 closes the normally open contacts 430 and 431, 432 and 433, 434 and 435 thereof. The closing of the normally open contacts 430, 431 of relay 429 establishes a holding circuit for the relay from the line 423 to the wire 174 around the switches 410, 416. The closing of the normally open contacts 432 to 435 of relay 429 connects the operating solenoid 188 of the solenoid valve which controls the flow of pressure fluid to and from the motors 101 to cause the valve to admit pressure fluid to the motor and move the top roll 66 into engagement with the upper surface of a sheet of veneer therebeneath and above the bottom roll 65. Simultaneously with the movement of the upper roll 66 into engagement with the veneer therebeneath, the stop 67 is raised allowing the sheet of veneer to be fed by the feed rolls onto the deck of the feed section aligned therewith.

The feed rolls 65, 66 continue to feed the veneer until the switch 152 is operated to allow its then closed contacts 270, 271 to open by the trailing end of the veneer passing out from underneath the member or feeler 153. This breaks the circuit to the operating solenoid 428 to relay 429 deenergizing the operating solenoid 188 of the solenoid valve allowing pressure fluid to be exhausted from the motor 101 whereupon the top roll 66 raises to its inoperative position and the stop 67 returns to its lower operative position.

The cycle of operations just described is repeated until the vertically movable ends of the conveyors reach or pass the position wherein the bottom conveyor 35 is in alignment with the discharge side of the rolls 65, 66, and the adjustable stop 155 operates the switch 416 to close its normally open contacts 440, 441 and open its normally closed contacts 424, 425. The closing of the contacts 440, 441 of switch 416 establishes a circuit from the wire 123, through the now closed contacts 395, 422 of selecting switch 390, wire 423, now closed contacts 440, 441 of switch 416, wire 407, normally closed contacts 271, 272 of down travel safety limit switch 273, wire 274, normally closed contacts 275, 276 of motor controller 245, wire 277, operating solenoid 278 of motor controller 245, wire 248 and overload contacts 250, 251 to line 132, thereby connecting the traverse motor 106 to the power lines 118, 132, 114 in such a manner that the motor rotates in a direction to lower the vertically movable ends of the conveyors. The motor continues to operate and the assembly to descend until the conveyor assembly reaches or passes the lower position, at which time the switch 416 is operated by the stop 156 to reclose its contacts 424, 425 and reopen its contacts 440, 441. The opening of contacts 440, 441 deenergize the operating solenoid 278 of motor controller 245 and stops the motor. The cycle of operations continues with the feeding apparatus delivering veneer to the decks of the dryer in sequence as long as the machine is continued in operation and veneer is introduced between the feed rolls 65, 66 of the feeding apparatus.

As an alternative construction to that of moving the movable ends of the conveyors 31–35 upwardly by the motor 16 which drives the conveyors, the drive shown can be omitted and the reversible motor 106 employed for reciprocating the movable ends of the conveyors in both directions. In this event a speed reduction would be interposed in the drive for moving the conveyors in one direction so that the resulting reciprocation would be a slow indexing movement in one direction and a rapid return in the opposite direction. In either of the arrangements shown or in the alternative arrangement just proposed, the cycle switch 111 and its operating mechanism is omitted and the feed rolls 65, 66 of the feed unit C are actuated to feed a sheet of veneer to one of the conveyors upon each actuation of the switch 410, assuming that there is a sheet of veneer between the pinch rolls in position to be fed at the time the switch is operated.

The embodiment shown in the invention in FIGS. 11, 12, 13 and 14, is generally similar to that shown in FIGS. 1 to 6 except for the fact that the stack of veneer sheets to be fed, instead of being placed upon an elevatable mechanism, is placed upon a non-elevatable support F and the desired alignment between the top thereof and the power operated sheet advancing mechanism interposed between the stack and the vertically indexible ends of the conveyors 31–35 is maintained by vertical movement or adjustment of the power operated mechanism. The principal physical changes in the embodiment shown in FIGS. 11–14 over the embodiment shown in FIGS. 1 to 6, are the construction of the pinch roll sheet advancing mechanism as a vertically movable assembly, an increase in the height of the right-hand part of the frame 52 to accommodate the vertical adjustment of the pinch roll assembly, the provision of hoist mechanism for adjusting or moving the pinch roll assembly vertically, and the transfer of the indexing switch and direction selection switch 160 to the vertically adjustable assembly and the trips 155—156 to the member 164 since the indexing and reversing of the movable ends of the conveyors 31–35 must be with reference to this vertically adjustable assembly as distinguished from a fixed part of the frame of the apparatus.

In the following description of the embodiment shown in FIGS. 11–14 only those parts of the apparatus are specifically mentioned which are different from the embodiment shown in FIGS. 1 to 6 and where differences are not noted the parts are the same. The duplicate parts in the two embodiments are designated by the same reference characters.

In FIGS. 11–14 the veneer V is shown as being brought to the infeed end of the feeding apparatus stacked upon a truck F of conventional construction. The operator either standing upon the floor or upon a raised platform pushes the piece of veneer on the stack between the pinch rolls 65, 66 of the sheet advancing mechanism until it strikes a stop 63. The pinch rolls 61, 62 and their drive etc., are adjustable vertically so that the pinch rolls can be maintained in substantial alignment with the top of the stack of veneer upon the truck, thereby facilitating the pushing of the top piece of veneer between the pinch rolls.

Some of the parts of the frame of this embodiment are slightly different than those of the previous embodiments and the corresponding, but slightly different, parts are herein designated by the same reference character with a prime mark affixed thereto.

In this embodiment the plates 75 of the earlier embodiments are omitted and replaced by relatively short plates 450 at opposite sides of the apparatus and to which the rolls 65, 66 and their operating mechanism, including the motors 84, 101, are connected in a manner similar to that in which they are connected to the plates 75 in the previous embodiment. The plates 450 have suitable tubular members welded thereto for supporting rollers 451 at each of their four corners and which rolls engage within suitable channel-like tracks 452 at opposite sides of the plates for guiding the plates in a generally vertical direction. The tracks or guides 452 are connected to the sides of the plates 76', 77' which face one another.

The vertically movable assembly including the plates 450, the feed rolls 65, 66, and the operating mechanism carried by the plates 450 are adapted to be moved vertically so that the pinch rolls can be aligned or approximately aligned with the top of the stack of veneer upon the truck F by a reversible electric hoist motor 455 including a solenoid release brake connected by a gear reduction unit 456 and a sprocket chain drive 457 to a transversely extending shaft 458 extending across the top of the frame and rotatably supported in a plurality of bearings. The shaft 458 is connected to the vertically movable plates 450 by a sprocket chain 460 reeved about upper and lower sprocket wheels 461, 462 and having its opposite ends connected to the plates 450. The upper sprocket wheels 461 are keyed to the shaft 458 and the lower sprocket wheels 462 are rotatably connected to the base of the frame. The weight of the vertically movable assembly is counterbalanced by a weight located between the two rear plates 76', 77' and operatively connected to the far end of the shaft 458 by a cable connected to the weight and, after passing over a sheave rotatably supported at the top of the frame, to a drum keyed to the rear end of the shaft. The hoist motor 455 may be operated in opposite directions to raise and lower the vertically movable assembly and align the pinch rolls 65, 66 with the top of the stack of veneer on the truck F by the operator through suitable control means, such as, up and down foot-operated switches (not shown) located at some convenient place about the machine.

The reference characters 470, 471 designate overtravel or safety limit switches for the vertically movable assembly comprising the rolls 65, 66.

It is also to be understood that in place of the upper continuous roll 62 shown in the application individual rolls or wheels similar to the construction shown in a co-pending application of Roy E. Worthington, Ser. No. 767,080, filed October 10, 1958, may be employed or other suitable pinch roll or wheel mechanism may be substituted for that shown.

The phrase "pinch rolls" as used throughout the appended claims is intended to cover not only the pinch rolls shown herein, but other suitable means for periodically advancing veneer from the top of a stack to the indexible ends of the conveyors 31–35.

The invention has been herein illustrated and described as though a single row of veneer was being processed at one time, the usual practice, however, is to process a plurality of sheets simultaneously, the number depending upon the width of the veneer sheets being treated and the width of the dryer, etc. Regardless of how the sheets of veneer are brought to and inserted between the feed rolls 65, 66, the feed apparatus of the present invention will automatically feed veneer to a multiple deck dryer in predetermined sequence and in properly spaced relation with respect to the other veneer on the various decks.

From the foregoing it will be apparent that the objects heretofore enumerated and others have been accomplished and that there has been provided a novel and improved apparatus for feeding veneer to a multiple deck dryer, or, in fact, any multiple deck machine in predetermined sequence and in predetermined spaced relation. While four preferred embodiments of the invention have been described with considerable detail, the invention is not limited to the particular constructions and cycles of operation shown and described, for example, the veneer sheets may be inserted in the conveyors of the feeding apparatus in any desired sequence. The conveyors need not be loaded successively or in any one direction of movement. It is, therefore, the intention to cover hereby all adaptations, modifications and uses of the feeding apparatus disclosed which come within the practice of those skilled in the art to which the invention relates and the scope of the appended claims.

Having thus described my invention, I claim as follows:

1. In apparatus for use in feeding veneer sheets from a stack into equipment having a plurality of vertically spaced conveyors, a plurality of vertically spaced power driven conveyors adapted to have their discharge ends permanently aligned with respective conveyors of the equipment to be fed, power operated mechanism adjacent to the entrance end of said power driven conveyors, said power operated mechanism comprising a member adapted to engage the top side of a sheet of veneer and advance or move it towards said power driven conveyors, means spaced from the entering ends of said power driven conveyors supporting them for pivoted movement about generally horizontal axes, means for supporting a stack of veneer sheets adjacent to the side of said power operated mechanism opposite to the side at which said power driven conveyors are positioned, power operated means for moving the entrance ends of said power driven conveyors in a generally vertical direction whereby they are sequentially moved past said power operated mechanism, means for automatically actuating said power operated mechanism in timed relation to the movement of said entrance ends of said power driven conveyors therepast to advance veneer sheets to said power driven conveyors as they sequentially align with said power operated mechanism, and means for producing relative vertical movement between said power operated mechanism and said means for supporting the stack of veneer sheets whereby the power operated mechanism and the top of the stack of veneer sheets may be maintained at the desired relative height.

2. In apparatus for use in feeding veneer sheets from a stack into equipment having a plurality of vertically spaced conveyors, a plurality of vertically spaced power driven conveyors adapted to have their discharge ends in fixed alignment with respective conveyors of the equipment to be fed, power operated mechanism adjacent to the entrance end of said power driven conveyors, said power operated mechanism comprising a member adapted to engage the top side of a sheet of veneer, means spaced from the entering ends of said power driven conveyors supporting them for pivoted movement about generally horizontal axes, means for supporting a stack of veneer sheets adjacent to the side of said power operated mechanism opposite to the side at which said power driven conveyors are positioned, power operated means for moving the entrance ends of said power driven conveyors in a generally vertical direction from a starting position whereby they are sequentially aligned with said power operated mechanism, means for automatically and intermittently actuating said power operated mechanism in timed relation to the movement of said entrance ends of said power driven conveyors therepast whereby the top veneer sheets of the stack is moved into said power driven conveyors sequentially as they align with said power operated mechanism, and means for producing relative vertical movement between said power operated mechanism and said means for supporting the stack of veneer sheets whereby the power operated mechanism and the top sack of veneer sheets may be maintained at the desired relative height.

3. In apparatus for use in feeding veneer sheets from a stack into equipment having a plurality of vertically spaced conveyors, a plurality of vertically spaced power driven conveyors adapted to have their discharge ends permanently aligned with the respective conveyors of the equipment to be fed, power operated mechanism adjacent to the entrance end of said power driven conveyors, said power operated mechanism comprising a member adapted to engage the top side of a sheet of veneer, means spaced from the entering ends of said power driven conveyors supporting them for pivoted movement about generally horizontal axes, means for supporting a stack of veneer sheets adjacent to the side of said power operated mechanism opposite to the side at which said power driven conveyors are positioned, power operated means for intermittently moving the entrance ends of said power driven conveyors in a generally vertical direction whereby they are sequentially aligned with said power operated mechanism, means for automatically and intermittently actuating said power operated mechanism in timed relation to the movement of said entrance ends of said power driven conveyors into alignment with said power operated mechanism to advance the top veneer sheet of the stack to said power driven conveyors sequentially while they are aligned with said power driven mechanism, and means for producing relative movement in a generally vertical direction between said power operated mechanism and said means for supporting the stack of veneer sheets whereby the power operated mechanism and the top of the stack of veneer sheets may be maintained at the desired relative height.

4. An apparatus for use in feeding veneer sheets from a stack into equipment having a plurality of vertically spaced conveyors as claimed in claim 1 wherein said power operated mechanism is actuated only during movement of the entrance ends of said power driven conveyors in one direction and includes means for moving the entrance ends of said power driven conveyors in the opposite direction at a relatively rapid rate.

5. An apparatus for use in feeding veneer sheets from a stack into equipment having a plurality of vertically spaced conveyors as claimed in claim 3 in which said means for intermittently moving the entrance ends of said power driven conveyors includes a stepping relay.

6. An apparatus for use in feeding veneer sheets from a stack into equipment having a plurality of vertically spaced conveyors, a plurality of vertically spaced power driven conveyors adapted to have their discharge ends in fixed alignment with the respective conveyors of the equipment to be fed, power operated mechanism adjacent to the entrance end of said power driven conveyors, said power operated mechanism comprising a member adapted to engage the top side of a sheet of veneer, means spaced from the entering ends of said power driven conveyors supporting them for pivoted movement about generally horizontal axes, means for supporting a stack of veneer sheets adjacent to the side of said power operated feed mechanism opposite to the side at which said power driven conveyors are positioned, power operated means for continuously moving the entrance ends of said power driven conveyors in a generally vertical direction whereby they are sequentially aligned with said power operated mechanism, means for automatically actuating said power operated mechanism in timed relation to the movement of said entrance ends of said power driven conveyors into alignment with said power operated mechanism to advance the top veneer sheet of the stack to said power driven conveyors sequentially while they are aligned with said power driven mechanism, and means for producing relative movement in a generally vertical direction between said power operated mechanism and said means for supporting the stack of veneer sheets whereby the power operated mechanism and the top of the stack of veneer sheets may be maintained at the desired relative height.

7. In apparatus for use in feeding veneer sheets from a stack into equipment having a plurality of vertically spaced conveyors, a plurality of vertically spaced power driven conveyors adapted to have their discharge ends permanently aligned with the respective conveyors of the equipment to be fed, power operated mechanism adjacent to the entrance end of said power driven conveyors, said power operated mechanism comprising a member adapted to engage the top side of a sheet of veneer, means for supporting a stack of veneer sheets adjacent to the side of said power operated mechanism opposite to the side at which said power driven conveyors are located, power operated means for producing continuous relative movement between the entrance ends of said power driven conveyors and said power operated mechanism in a generally vertical direction whereby the entrance ends of said power driven conveyors are sequentially aligned with said power operated mechanism, means for automatically actuating said power operated feed mechanism in timed relation to the relative movement therebetween and said entrance ends of said power driven conveyors to advance the top veneer sheet of the stack to said power driven conveyors sequentially while they are aligned with said power driven mechanism, and means for producing relative movement in a generally vertical direction between said power operated mechanism and said means for supporting the stack of veneer sheets whereby the power operated mechanism and the top of the stack of veneer sheets may be maintained at the desired relative height.

8. An apparatus for use in feeding veneer sheets from a stack into equipment having a plurality of vertically spaced conveyors as claimed in claim 1 in which said power operated mechanism comprising a member adapted to engage the top of a sheet of veneer and advance or move it towards said power driven conveyors is vertically adjustable to maintain the desired vertical relationship therebetween and the top of the stack.

9. An apparatus for use in feeding veneer sheets from a stack into equipment having a plurality of vertically spaced conveyors as claimed in claim 2 wherein said power operated mechanism is actuated only during movement of the entrance ends of said power driven conveyors in one direction and includes means for moving the entrance ends of said power driven conveyors in the opposite direction at a relatively rapid rate.

10. An apparatus for use in feeding veneer sheets from from a stack into equipment having a plurality of vertically spaced conveyors as claimed in claim 3 wherein said power operated mechanism is actuated only during movement of the entrance ends of said power driven conveyors in one direction and includes means for moving the entrance ends of said power driven conveyors in the opposite direction at a relatively rapid rate.

11. An apparatus for use in feeding veneer sheets from a stack into equipment having a plurality of vertically spaced conveyors as claimed in claim 2 in which said power operated mechanism comprising a member adapted to engage the top of a sheet of veneer and advance or move it towards said power driven conveyors is vertically adjustable to maintain the desired vertical relationship therebetween and the top of the stack.

12. An apparatus for use in feeding veneer sheets from a stack into equipment having a plurality of vertically spaced conveyors as claimed in claim 3 in which said power operated mechanism comprising a member adapted to engage the top of a sheet of veneer and advance or move it towards said power driven conveyors is vertically adjustable to maintain the desired vertical relationship therebetween and the top of the stack.

13. An apparatus for use in feeding veneer sheets from a stack into equipment having a plurality of vertically spaced conveyors as claimed in claim 6 in which said power operated mechanism comprising a member adapted to engage the top of a sheet of veneer and advance or move it towards said power driven conveyors is vertically adjustable to maintain the desired vertical relationship therebetween and the top of the stack.

14. An apparatus for use in feeding veneer sheets from a stack into equipment having a plurality of vertically spaced conveyors as claimed in claim 7 in which said power operated mechanism comprising a member adapted to engage the top of a sheet of veneer and advance or move it towards said power driven conveyors is vertically adjustable to maintain the desired vertical relationship therebetween and the top of the stack.

References Cited in the file of this patent
UNITED STATES PATENTS

| | | |
|---|---|---|
| 2,649,182 | Parker | Aug. 18, 1953 |
| 2,799,381 | Beckley | July 16, 1957 |
| 2,804,192 | Armstrong | Aug. 27, 1957 |
| 2,883,033 | Armstrong | Apr. 21, 1959 |